United States Patent
Gustafsson et al.

(10) Patent No.: US 12,332,139 B2
(45) Date of Patent: Jun. 17, 2025

(54) ROTARY ENCODER AND A METHOD FOR DETERMINING MALFUNCTION OF A ROTARY ENCODER

(71) Applicant: LEINE & LINDE AB, Strängnäs (SE)

(72) Inventors: Mats Gustafsson, Stallarholmen (SE); Martin Lundgren, Strängnäs (SE); Robin Johansson, Strängnäs (SE)

(73) Assignee: LEINE & LINDE AB, Strängnäs (SE)

( * ) Notice: Subject to any disclaimer, the term of this patent is extended or adjusted under 35 U.S.C. 154(b) by 357 days.

(21) Appl. No.: 18/119,900

(22) Filed: Mar. 10, 2023

(65) Prior Publication Data
US 2023/0296477 A1  Sep. 21, 2023

(30) Foreign Application Priority Data
Mar. 15, 2022  (EP) .................................... 22162259

(51) Int. Cl.
| | | |
|---|---|---|
| *G01D 18/00* | (2006.01) | |
| *G01D 5/347* | (2006.01) | |
| *G01M 13/04* | (2019.01) | |
| *G08B 21/18* | (2006.01) | |

(52) U.S. Cl.
CPC .......... *G01M 13/04* (2013.01); *G01D 5/3473* (2013.01); *G08B 21/187* (2013.01)

(58) Field of Classification Search
CPC ...... F16C 19/52; F16C 35/077; F16C 41/007; F16C 41/008; F16C 2233/00; G01D 5/244; G01D 5/24433; G01D 5/24457; G01D 5/3473; G01D 11/02; G01D 18/00; G01M 13/04; G08B 21/187
See application file for complete search history.

(56) References Cited

U.S. PATENT DOCUMENTS
2021/0270644 A1  9/2021  Gustafsson

OTHER PUBLICATIONS

European Search Report issued in corresponding EP Patent Application No. 22162259, dated Aug. 22, 2022, pp. 1-2.

*Primary Examiner* — Alexander A Mercado
(74) *Attorney, Agent, or Firm* — Carter, DeLuca & Farrell LLP

(57) ABSTRACT

A rotary encoder includes a stator, a malfunction determination device, and a shaft having a bearing configuration internally connected to an axial bushing arranged in a housing. The bearing configuration provides for rotation of the shaft relative to the housing. A rotor is attached to the shaft. The malfunction determination device includes a detection device configured to determine whether a connection device is operably connected between a fixed portion of the encoder and the bushing, and to output the status of the connection to a control device. If there is no connection, the detection device determines a rotation of the bushing associated with a malfunction of the bearing configuration.

20 Claims, 5 Drawing Sheets

ROTARY ENCODER AND A METHOD FOR DETERMINING MALFUNCTION OF A ROTARY ENCODER

CROSS-REFERENCE TO RELATED APPLICATIONS

The present application claims priority to Application No. 22162259.0, filed in the European Patent Office on Mar. 15, 2022, which is expressly incorporated herein in its entirety by reference thereto.

FIELD OF THE INVENTION

The present invention relates to a rotary encoder, a method for determining a malfunction of a rotary encoder, and a non-transitory computer-readable storage medium having stored therein instructions that, when executed by a processor, cause the processor to perform a method for determining a malfunction of a rotary encoder. As described in more detail below, the rotary encoder may include, for example, a rotor and a shaft having a bearing configuration, and the malfunction may be related to a blocked bearing in the rotary encoder.

BACKGROUND INFORMATION

In certain conventional systems, rotary encoders are used in industry for position and speed monitoring and are typically mounted on a shaft of a motor or a gearbox of an assembly. Rotary encoders may be equipped with a rotor unit and a stator unit for detecting operational parameters of the shaft of the assembly.

Rotary encoders may be assembled with different shafts and bearings. In case bearings of the rotary encoder are blocked or get sluggish, a driving torque on the rotary encoder shaft is increased and may eventually lead to the breaking of a connection between the rotary encoder shaft and the shaft of the assembly.

SUMMARY

Example embodiments of the present invention provide a rotary encoder, which seeks to mitigate, alleviate, or eliminate one or more of the above-identified deficiencies, singly or in any combination.

Example embodiments of the present invention provide a method for determining malfunction of a rotary encoder.

Example embodiments of the present invention provide a rotary encoder and a non-transitory computer-readable storage medium having stored therein instructions that, when executed by a processor, cause the processor to perform a method for determining a malfunction of a rotary encoder.

Example embodiments of the present invention provide a method that may achieve a more reliable and safe operation of a rotary encoder.

Example embodiments of the present invention provide a method, a rotary encoder, and a non-transitory computer-readable storage medium having stored therein instructions that, when executed by a processor, cause the processor to perform a method that may achieve an automated and user-friendly detection of malfunctioning bearings of a rotary encoder.

According to an example embodiment of the present invention, a rotary encoder includes a shaft having a bearing configuration that is internally connected to an axial bushing arranged in a housing. The bearing configuration is adapted to allow rotation of the shaft relative to the housing. The rotary encoder also includes a rotor, which is attached to the shaft, a stator, and a malfunction determination device adapted to determine a malfunction of the bearing configuration. The malfunction determination device includes a connection device and a detection device adapted to determine whether a connection device is operably connected between a fixed portion of the rotary encoder and the bushing, and to output the status of the connection to a control device. The detection device is adapted to determine a rotation of the bushing associated with the malfunction of the bearing configuration, if there is no connection. Thus, for example, a malfunction of the bearing configuration may be determined in an efficient and reliable manner so that extensive damage associated with malfunctioning of an assembly that includes the rotary encoder may be avoided. Additionally, dangerous situations, such as a break down associated with an assembly that includes the rotary encoder, may be avoided. Moreover, safety of an assembly that includes the rotary encoder may be improved.

For example, safe and reliable operation of the rotary encoder is provided. Thus, operation of an associated assembly may be interrupted before severe damage or wear of components of the assembly occur. High standards of operation, involving a small number of unexpected disturbances, may be achieved.

For example, the expected service time of the bearing configuration may be substantially achieved due to reduction of risk for continued operation of the rotary encoder having malfunctioning components. This also allows, to a further extent, to make use of data collected by the rotary encoder for statistics purposes.

For example, it is possible to, with high accuracy, determine that a malfunction of the bearing configuration is identified as the cause of improper operation of the rotary encoder.

The connection device may include an electrical circuit to which an electrical signal is provided. The fixed portion includes the stator, and the electrical circuit is connected between the stator and the bushing. The detection device, in connection with determining whether there is a connection, determines whether there is an electrical signal. A malfunction of the bearing configuration is determined in response to there being no electrical signal. By providing such an electrical circuit, the determination of whether there is a connection between the stator and the bushing is facilitated so that a malfunction of the bearing configuration may be readily and efficiently obtained.

The electrical circuit may include at least one electrical conductor being connected to the bushing via a contacting member. The electrical circuit may include two, or more, electrical wires. Accordingly, the connection of the electrical circuit may be readily and efficiently obtained and controlled.

The contacting member may be configured to be attached to the bushing. The contacting member may be configured to be attached to the bushing adjacent to the stator. The contacting member may include a contacting knob.

The connection device may include a flexible support member adapted to facilitate the connection between the fixed portion and the bushing. By thus providing a flexible support member, the connection may be readily and efficiently provided. Such a flexible support member facilitates supporting the electrical circuit. The flexible support member may be a flexible strip. The connection device may be configured to provide a wireless connection between the fixed portion and the bushing. By thus providing a wireless connection by the connection device, a connection between the fixed portion and the bushing may be obtained, as well as a detection of lost connection. The wireless connection may be provided by the emission or transmission of light, e.g., by a light emitting device, by a magnetic connection, and/or by an inductive connection.

The malfunction determination device may include a plate arranged between the rotor and the bushing, and the plate may be attached to the housing and adapted to provide fixation in the axial direction of the shaft toward the bushing. The connection device may be efficiently fixated in relation to the bushing. The plate may be coaxially arranged relative to the shaft. The plate may be ring-shaped and may be attached to the housing by screw joint members so as to facilitate providing fixation in the axial direction of the shaft toward the bushing. The plate may be arranged adjacent to the bushing and between the bushing and the rotor. A portion of the support member may be arranged in relation to the plate, between the plate and the busing, so that the plate may apply pressure against the support member towards the bushing for the fixation.

The malfunction determination device may include a shear pin fixedly arranged between the bushing and the plate, the shear pin being adapted to break in connection with rotation of the bushing. By utilizing a shear pin, a certain resistance against rotation of the bushing may be provided so that loss of connection of the connection device may be readily and efficiently controlled. The shear pin may be configured to break in response to the rotational torque exceeding a predetermined threshold value.

The malfunction determination device may be configured to take action, in response to a determination that there is no connection, to facilitate preventing extensive damage associated with the malfunctioning of an assembly that includes the rotary encoder. An electronic control device of the malfunction determination device may be adapted to take the action. By taking action, dangerous situations, such as a break down associated with an assembly that includes the rotary encoder, may be efficiently avoided. The malfunction determination device may be configured to trigger an alarm when taking action. The electronic control device may be configured to, when taking action, shut down the operation of the assembly that includes the rotary encoder. The arrangement malfunction determination device may be configured to, when taking action, inform operators of the situation, the information being, for example, visual, audible, and/or tactile.

According to an example embodiment of the present invention, a method is provided for determining a malfunction of a bearing configuration of a rotary encoder. The rotary encoder includes a shaft having the bearing configuration. The bearing configuration is internally connected to an axial bushing arranged in a housing, and the bearing configuration is configured to allow rotation of the shaft relative to the housing. The rotary encoder includes a rotor, which is attached to the shaft, a stator, and a connection device operably connected between a fixed portion of the rotary encoder and the bushing. The method includes: determining whether there is a prevailing operable connection between the fixed portion of the rotary encoder and the bushing; and, if there is no connection, determining that there is a rotation of the bushing associated with a malfunction of the bearing configuration.

The connection device may include an electrical circuit to which an electrical signal is provided. The fixed portion includes the stator, the electrical circuit being connected between the stator and the bushing. The determination of whether there is a prevailing operable connection may include determining whether there is an electrical signal; and determining that there is a rotation of the bushing associated with a malfunction of the bearing configuration in response to there being no electrical signal.

The method may provide the same or similar advantages discussed above.

According to an example embodiment of the present invention, a non-volatile computer-readable storage medium has stored therein instructions, which, when executed by a processor, causes the processor to carry out the method described herein.

The rotary encoder may be utilized, for example, in paper mill systems and rolling mills, elevator systems, oil rig systems, various machine tools, etc. The rotary encoder may thus be applicable to a great variety of assemblies.

The rotary encoder may be utilized, for example, in various assemblies that include an engine and/or motor for rotating a shaft. The assembly may be arranged as or include a vehicle, such as a mining machine, tractor, dumper, wheel-loader, forest machine, earthmover, road construction vehicle, road planner, emergency vehicle, tracked vehicle, etc. The rotary encoder may be utilized in systems that include a rotary shaft, e.g., watercraft, such as, for example, motorboats, steamers, ferries, ships, submarines, etc.

The rotary encoder may be utilized in various stationary assemblies and/or platforms that include a rotating shaft, such as a windmill for generating electricity.

A number of rotary encoders, e.g., 2 to 4 or more rotary encoders, may be provided in the assembly for detecting operational parameters of various components, units, arrangements, etc., of the assembly.

A link refers, for example, to a communication link, which may be a physical connection, such as a multicore cable, an opto-electronic communication line, etc., or a non-physical connection, such as a wireless connection, e.g., a radio link, a microwave link, etc. The communication may be achieved by transmission of analog and/or digital signals. In connection with digital communication, the link may be arranged as a digital data interface, e.g., a serial data interface.

A control device or electronic control device may include only one electronic control device or a number of connected electronic control devices. The control device(s) may be adapted to perform the method described herein.

It should be understood that functions, steps, or operations noted in the blocks may occur out of the order described and/or illustrated. For example, two blocks illustrated in succession may be executed substantially concurrently or the blocks may be executed in the reverse order, depending upon the functionality, acts, or operations involved. Also, the functions, steps, or operations noted in the blocks may be executed continuously, e.g., in a loop.

A shear pin refers, for example, to a mechanical component adapted to break once a predetermined force is applied. Mechanical properties of the shear pin may be determined empirically, for example. Any suitable value of the predetermined break threshold value of the shear pin may be chosen.

Further features and aspects of example embodiments of the present invention are described in more detail below with reference to the appended schematic Figures.

DETAILED DESCRIPTION

FIGS. 1a, 1b, 2a, 2b, 3a, and 3b schematically illustrate a rotary encoder 200 according to an example embodiment of the present invention.

Figure 1A:
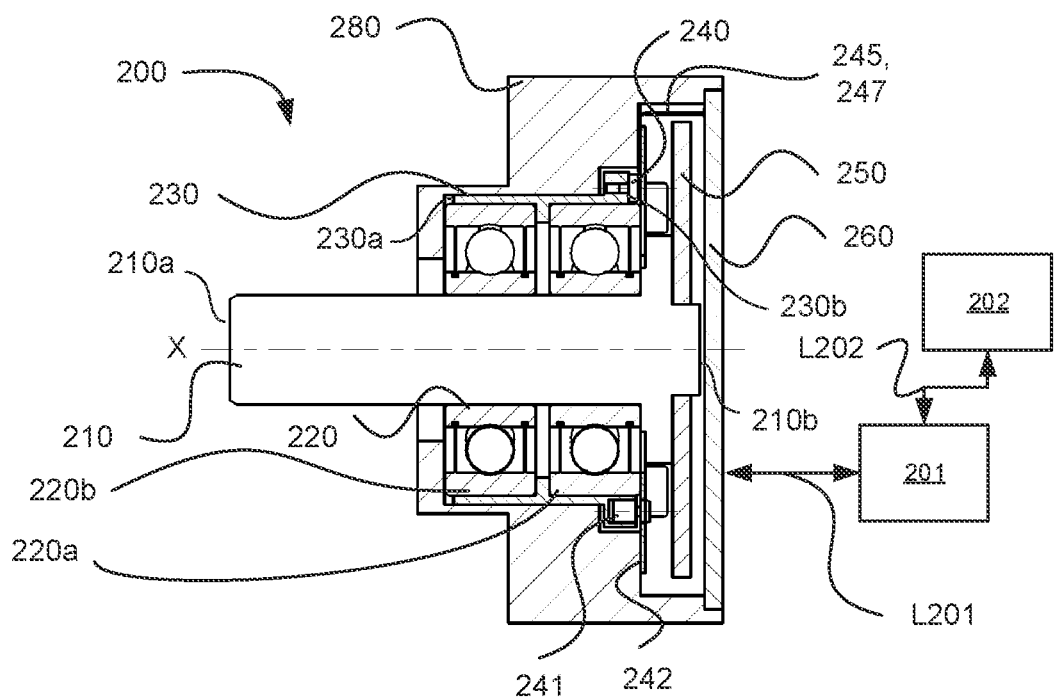
FIG. 1a is a cross-sectional view of a rotary encoder according to an example embodiment of the present invention.
Figure 1B:
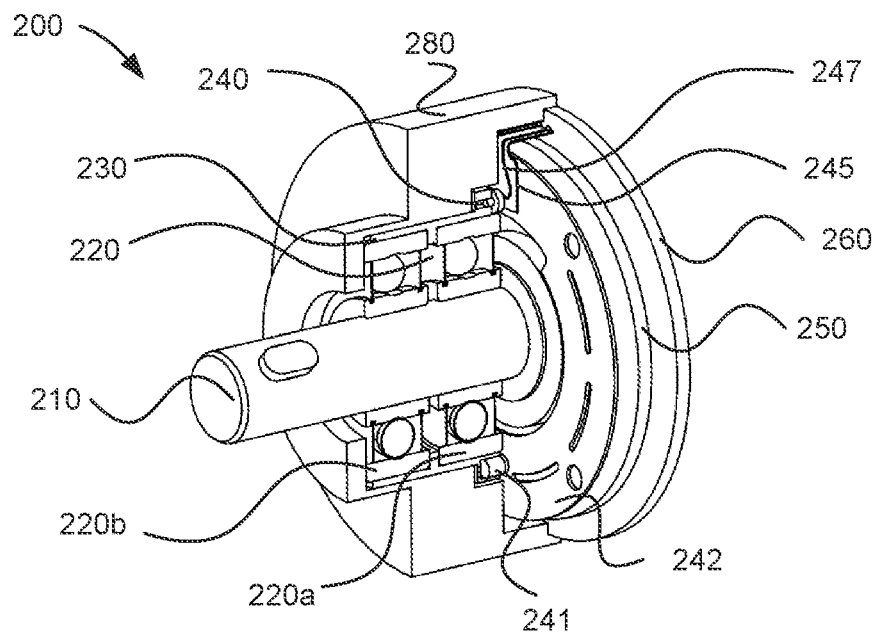
FIG. 1b is a perspective view of the rotary encoder.
Figure 2A:
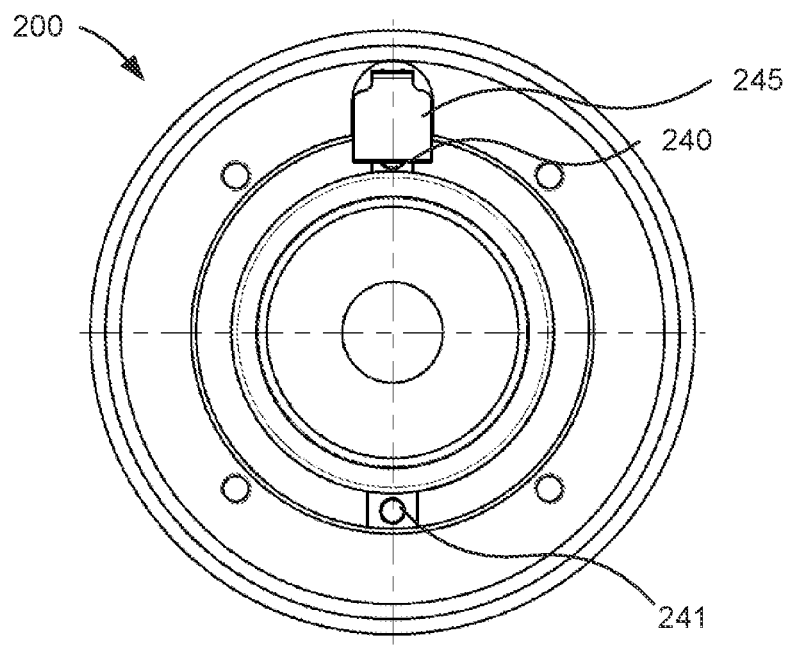
FIG. 2a is a cross-sectional view of the rotary encoder.
Figure 2B:
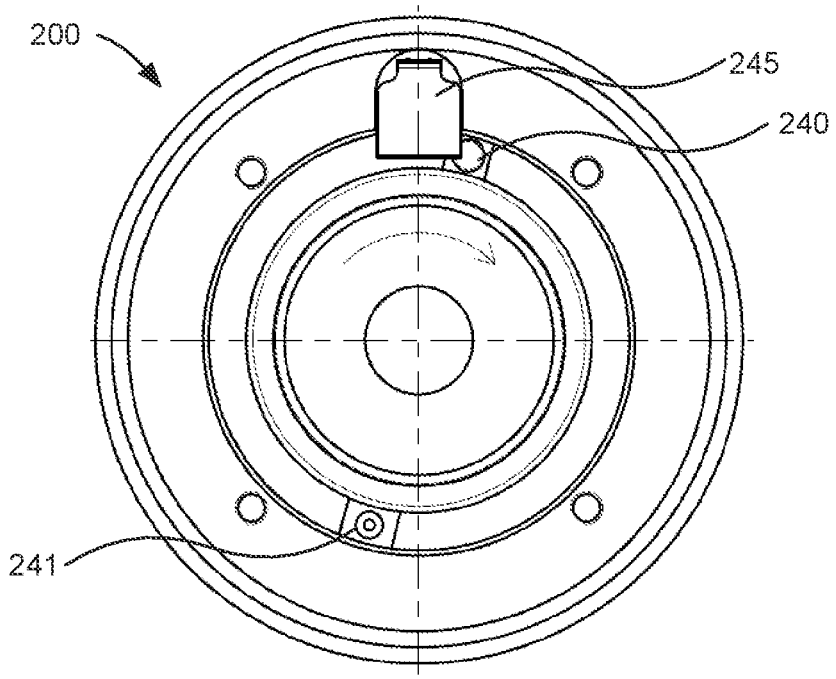
FIG. 2b is another cross-sectional view of the rotary encoder.
Figure 3A:
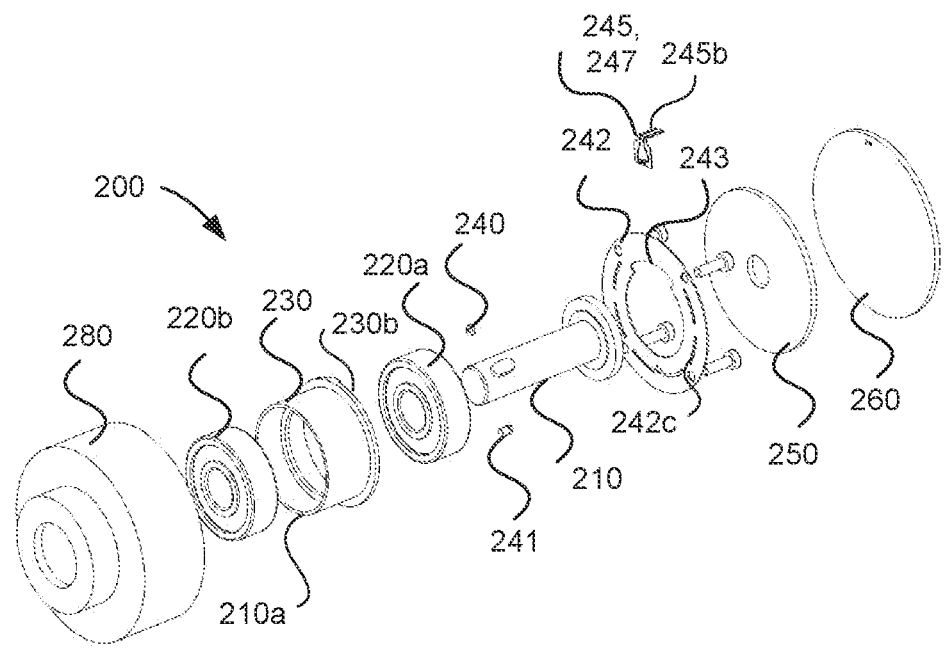
FIG. 3a is an exploded view of the rotary encoder.
Figure 3B:
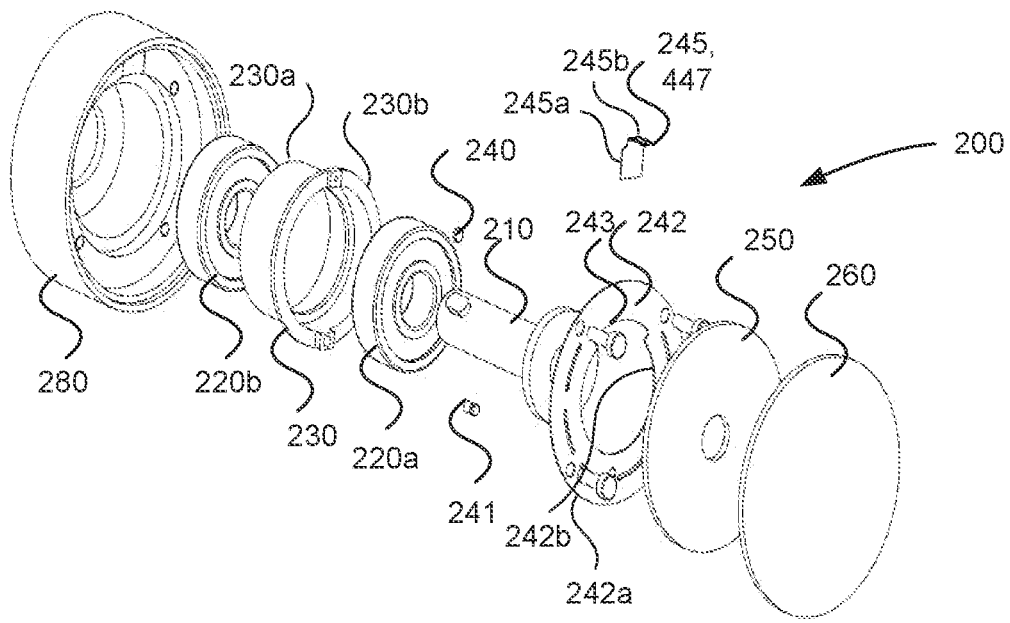
FIG. 3b is another exploded view of the rotary encoder.

FIG. 1a is a cross-sectional view of the rotary encoder 200, FIG. 1b is a perspective view of the rotary encoder 200, FIGS. 2a and 2b are a cross-sectional views of the rotary encoder 200, and FIGS. 3a and 3b are exploded views of the rotary encoder 200.

The rotary encoder 200 includes a shaft 210. The shaft 210 has a first end portion 210a and an opposite second end portion 210b. The shaft 210 is configured to rotate about an axis X.

The rotary encoder 200 includes a bearing housing 280, also referred to herein as a housing. The housing 280 is arranged to house a bearing configuration 220. The housing 280 may be formed of any suitable material, such as a metal or an alloy, e.g., aluminum, stainless steel, etc. The housing 280 may be formed at least partly of a plastic material and/or a ceramic.

The bearing configuration 220 includes a first bearing unit 220a fixedly arranged to the shaft 210. The first bearing unit 220a may include any suitable bearings. The bearing configuration 220 includes a second bearing unit 220b fixedly arranged to the shaft 210. The second bearing unit 220b may include any suitable bearings. The bearing configuration 220 is configured to allow rotation of the shaft 210 relative to the housing 280. The rotary encoder may be provided with any suitable bearing units, e.g., plain bearings, roller bearings, etc.

The first bearing unit 220a and second bearing unit 220b may be arranged next to each other around the shaft 210. The first bearing unit 220a and second bearing unit 220b may be separated by a predetermined distance from each other around the shaft 210. The second bearing unit 220b is arranged closer to the second end portion 210b of the shaft 210 than the first bearing unit 220a.

Each bearing unit 220a, 220b has an inner ring-shaped portion arranged around and attached to the shaft 210, and an outer ring shaped portion connected to the housing 280 via a bearing bushing 230. Each bearing unit 220a, 220b is fixedly attached to the shaft 210 and the bearing bushing 230.

The bearing bushing 230 is arranged around the bearing configuration 220 and has a ring-shaped configuration. The bearing bushing 230 is received within a portion of the housing 280.

The bearing bushing 230 is rotatable relative to the housing 280 when a rotational force between the bearing bushing 230 and the housing 280 exceeds a predetermined threshold value. The predetermined threshold value is determined so that in a first operational state, when the bearing configuration 220 is operating without any malfunctioning, no rotation of the bearing bushing 230 takes place, and in a second operational state, when the bearing configuration 220 is malfunctioning, a rotation of the bearing bushing 230 takes place. The bearing configuration 220 is considered to be malfunctioning when at least one of the bearing units 220a, 220b becomes sluggish or blocks rotation, which leads to an increased rotational force between the inner ring-shaped portion and the outer ring-shaped portion of the bearing unit(s) 220a, 220b when the shaft rotates.

The bearing bushing 230 has a first end portion 230a arranged to face in the same direction as the first end portion 210a of the shaft 210 and has a second end portion 230b, opposite to the first end portion 230a, arranged to face in the same direction as the second end portion 210b of the shaft 210.

The second end portion 230b of the bearing bushing 230 may have a wider outer diameter than the remaining portion of the bearing bushing 230 for facilitating the connection at the second end portion 230b.

At least two bearing units may be provided at the shaft 210 for achieving a balanced and low-vibration operation of the rotary encoder 200.

The shaft 210 is configured to be attached to a rotating device of an assembly, such as an assembly described herein. The rotary encoder 200 is adapted to determine values of a set of operational parameters of the shaft 210. The operational parameters may be characteristics of operation of the assembly. The set of operational parameters may include a parameter relating to the prevailing angular position of the shaft 210. The set of operational parameters may include any of the parameters: prevailing angular position of the shaft 210, rotational speed of the shaft 210, etc.

The shaft 210 may be connectable to a rotating device of the assembly by any suitable fastening device. This allows a connection in a rotatably fixed manner. A connection between the shaft 210 and a rotating device of the assembly may be provided by a shaft coupling device.

The rotary encoder 200 is configured to detect relative rotation of a rotor 250 and a stator 260. The rotor 250 is fixedly secured to the shaft 210 and is attached to the shaft 210 at the second end portion 210b of the shaft 210. The rotor 250 is rotatable with the shaft 210. The rotation of the rotor 250 with respect to the stator 260 may be detected using any technology capable of detecting such changes. Examples of such technologies include capacitive, optical, inductive, and/or magnetic detection, etc. The rotary encoder 200 may be configured as an incremental and/or an absolute rotary encoder. It should be appreciated that the rotor and/or the stator may refer to single components or combinations of components that are arranged as a rotor and/or a stator.

The stator 260 may be attached to housing 280 toward the second end portion 210b of the shaft 210. The stator 260 is fixed relative to the shaft 210 so that the shaft 210 rotates relative to the stator 260. The rotor 250 may be arranged between the stator 260 and the bearing configuration 220. The rotor 250 may be arranged between the stator 260 and the bearing bushing 230. The method described herein may applicable to rotary encoders having a radial measuring configuration.

The rotor 250 further includes a first disc having a scale for detection of relative rotation between the rotor 250 and the stator 260. The first disc is mounted at the shaft 210. When the shaft 210 rotates with respect to the stator 260, rotation measurement circuitry at the stator 260 can detect changes in the scale with respect to the rotation measurement circuitry. For example, the scale may include inductive, capacitive, and/or magnetic elements configured to cause a corresponding inductive, capacitive, and/or magnetic signal when the first disc is rotated with respect to the stator 260. The scale may be part of an optical rotary encoder, in which the rotary encoder is configured to shine light of a light source 246 (e.g., LED, laser diode, etc.) onto a light detector 244 (e.g., photodiode) through slits in the first disc. Alternatively, a reflective implementation of an optical rotation measurement device for an optical rotary encoder may be used. Alternatively, any suitable components being arranged for detecting operational parameters may be provided in the rotary encoder 200. The components are chosen on the basis of the operation parameter detection technique of the rotary encoder 200.

The stator 260 includes a second disc. The second disc includes a measurement apparatus configured to detect relative motion of the first and second discs, e.g., by detecting the inductive, optical, capacitive, and/or magnetic signals. The second disc may include a printed circuit board.

The rotor 250 may be arranged as a graduation carrier or code disc, and the stator 260 may be arranged as a detector. For example, the stator 260 is not disc-shaped and is arranged as a scanner or scanning unit.

A control device 201 is adapted to communicate with the rotary encoder 200 via a link L201. For example, the control device 201 is adapted to communicate with the rotation measurement circuitry at the stator 260 via the link L201. The stator 260 is configured to send signals that include information about operational parameters to the control device 201 via the link L201.

The control device 201 is configured to determine values of the operational parameters and to present determined values of the operational parameters via any suitable presentation device 202, e.g., a display, to an operator of the assembly and/or the rotary encoder 200. The control arrangement 201 is adapted to generate control signals for a motor drive within the assembly based on the operational parameters.

The rotation measurement circuitry at the stator 260 may be adapted to perform the same functions as the control device 201. Detection of operational parameters may be performed by any of the rotation measurement circuitry at the stator 260 and/or the control device 201.

The rotary encoder 200 may further be configured for electromagnetic compatibility scenarios. The bearing housing 280 of the rotary encoder 200 may be configured to affix and protect fragile EMC components from vibrations. The rotary encoder 200 may include electrostatic discharge, ESD, shielding configured to shield the rotary encoder 200 from electrostatic charge and/or discharge. The rotary encoder 200 may include electromagnetic shielding configured to prevent electromagnetic radiation to and/or from the rotary encoder 200 exceeding a predetermined threshold. The rotary encoder 200 may be configured to function without degradation in the presence of a predetermined electromagnetic disturbance. In other words, the rotary encoder 200 may be electromagnetically immune to a predetermined radio frequency interference.

The rotary encoder 200 may include a set of sealing components adapted to seal the rotary encoder 200 from the environment.

The rotary encoder 200 may include a set of spacers configured to fix a relative position between two or more components of the rotary encoder 200.

The rotary encoder 200 include malfunction determination device configured to determine a malfunction of the bearing configuration 220

The malfunction determination device includes a connection device 245, 247 operably connected between a fixed portion 260, 280 of the rotary encoder 200 and the bearing bushing 230. The fixed portion of the rotary encoder may include the stator 260 and the housing 280.

The connection device 245, 247 may be operably connected between the stator 260 and the bushing 230.

The connection device 245, 247 may include an electrical circuit 247 to which an electrical signal is provided. The electrical circuit 247 is arranged between the stator 260 and the bushing 230. The electrical circuit 247 may be connected to the stator 260 so as to facilitate providing the electrical signal in the circuit. The electrical signal may be provided to the electrical circuit 247 by the stator 260.

The rotary encoder 200 may include a contacting member 240 for facilitating connection of the connection member to the bearing bushing 230. The contacting member 240 may be attached to the bearing bushing 230 and may be attached to the second end portion 230b of the bearing bushing 230 so that the contacting member 240 is facing in the direction toward the stator 260. The contacting member 240 may include a contacting knob.

The electrical circuit 247 may be connected to the bearing bushing 230 via the contacting member 240. The electrical circuit 247 may include two electrical wires connected to the bushing 230 via the contacting member 240. In other words, the electrical circuit 247 operates as a switch that is closed via the contacting member 240 in the first operational state and that is open in the second operational state.

The connection device 245, 247 includes, for example, a flexible support member 245 adapted to facilitate the connection between the stator 260 and the bearing bushing 230. The electrical circuit 247 may be supported by the flexible support member 245. The electrical circuit 247 may be to the flexible support member 245.

The flexible support member 245 has an L-shaped profile, for example, as illustrated in FIGS. 3a and 3b. The flexible support member 245 may include a first plate portion 245a arranged between the second end portion 230b of the bearing bushing 230 and the rotor 250 and extending from the contacting member 240 outwardly in a substantially orthogonal direction relative to the axial extension of the shaft 210 passed the outer circumference of the rotor 250. The flexible support member 245 may have a second plate portion 245b configured to provide a transition from the first plate portion 245a and extending outside of the outer circumference of the rotor 250 toward the stator 260 to a connection point of the stator 260 for providing connection to the stator 260.

The rotary encoder 200 may include a plate 242 arranged between the rotor 250 and the bearing bushing 230. The plate 242 is attached to said housing 280. The plate 242 may be arranged to provide fixation in the axial direction of the shaft 210 towards the bearing bushing 230.

The plate 242 may be arranged coaxially relative to the shaft 210. The plate 242 may be ring-shaped and may be formed as a disc. The ring-shaped plate 242 has an outer circumference 242a and an inner circumference 242b, as illustrated in FIG. 3b. The ring-shaped plate 242 thus has a central opening coaxially arranged relative to the shaft 210. The inner circumference 242b has an arc-shaped recess 243 arranged in relation to the contacting member 240 connected to the bearing bushing 230. The arc-shaped recess 243 has an angular extension so as to facilitate rotation in relation to the contacting member 240.

The plate 242 has a number of arc-shaped grooves 242c arranged distributed along the plate 242 between the outer circumference 242a and the inner circumference 242b, the arc-shaped grooves being through-grooves extending through the plate 242. The grooves 242c provide improved resilient characteristics of the plate 242.

The plate 242 may be attached to the housing 280 by screw joint members so as to facilitate providing the fixation in the axial direction of the shaft 210 toward the bearing bushing 230. The plate 242 may be attached to the housing 280, e.g., by an adhesive, a fastener, etc.

The plate 242 may be arranged adjacent to the bearing bushing 230, between the bearing bushing 230 and the rotor 250. The first plate portion 245a of the support member 245 may be arranged between the plate 242 and the bearing busing 230, so that the plate 242 may apply pressure against the first plate portion 245a of the support member 245 toward the bearing bushing 230.

A shear pin 241 may be fixedly arranged between the bearing bushing 230 and the plate 242. The shear pin 241 is configured to break in connection with rotation of the bearing bushing 230. The shear pin 241 may be fixedly arranged between the bearing bushing 230 and the plate 242 in relation to the second end portion 230b of the bushing 230. The shear pin 241 is, for example, arranged between the bearing bushing 230 and the plate 242 so that it breaks if the rotational force exceeds a predetermined threshold value. The shear pin 241 may be arranged between the bearing bushing 230 and the plate 242 so that it breaks if the torque associated with rotation of the bearing bushing 230 exceeds a predetermined threshold value.

Rotation of the bearing bushing 230 may result if the rotational force exceeds a predetermined threshold value. Rotation of the bearing bushing 230 may result if the torque associated with rotation of the bearing bushing 230 exceeds a predetermined threshold value.

The shear pin 241 may be fixedly arranged between the bearing bushing 230 and the plate 242 at substantially the opposite side of the bearing bushing 230 relative to the connection device 245, 247, in relation to the direction orthogonal to the axial direction. The shear pin 241 is, for example fixedly arranged between the bearing bushing 230 and the plate 242 at substantially the opposite side of the second end portion 230b of the bearing bushing 230 relative to the connection device 245, 247 and, hence, relative to the contacting member 240.

The malfunction determination device of the rotary encoder 200 may include a detection device 205 adapted to determine whether there is a connection of the connection device 245, 247 between the stator 260 and the bushing 230. The detection device 205 is configured to determine whether the connection device 245, 247 is operably connected between the stator 260 and the bushing 230.

The detection device 205 is configured to determine a rotation of the bearing bushing 230 associated with a malfunction of the bearing configuration 220 if there is no connection.

The detection device 205 is configured to determine whether there is an electrical signal in the electrical circuit 247 of the connection device, when determining whether there is a connection. The detection device 205 is configured to determine a rotation of the bearing bushing 230 associated with malfunction of the bearing configuration 220 if there is no electrical signal.

The detection device 205 is configured to send the status of the bearing configuration 220 (e.g., no malfunction, malfunction, etc.) to the control arrangement 201 via the link L201.

The circuit of the detection device 205 may be located either on a separate printed circuit board (PCB) or on the PCB of the stator 260.

The electrical circuit 247 may enable a normal operation of the rotation measurement circuitry of the stator 260 in the first operational state and to disable the operation of the rotation measurement circuitry of the stator 260 in the second operational state. For example, this is achieved by connecting the electrical circuit 247 in series with a power supply of the stator 260. In another example, provided that optical scanning is used, the electrical circuit 247 is connected in series with a power supply of the light source 246. In both examples, the determination of operational parameters is disabled in the second operational state and therefore the signals including information about operational parameters sent to the control device 201 via the link L201 become invalid. Thus, the status of the bearing configuration 220 is sent to the control device 201 in the form of valid or invalid operational parameters. In such examples, where in the second operational state the operation of the rotation measurement circuitry of the stator 260 is disabled, the stator 260 represents the detection device 205.

The control arrangement 201 is adapted to communicate with the presentation device 202 via a link L202. The presentation device 202 may include a display for visual presentation to an operator. The presentation device may include visual, audio, and/or tactile presentation devices for presenting information about operational status of the rotary encoder 200. For example, the presentation device 202 is adapted to present information to an operator when malfunction of the bearing configuration 220 has been determined.

The control device 201 may be adapted to generate an alarm signal when malfunction of the bearing configuration 220 is occurring. The control arrangement 201 is adapted to provide the alarm signal, e.g., by the presentation device 202. The alarm signal is provided so as to indicate malfunctioning of the bearing configuration 220 to an operator.

The control device 201 may be configured to automatically interrupt operation of the assembly connected to rotary encoder 200 when malfunction of the bearing configuration 220 is occurring. The control device 201 may be arranged to automatically interrupt operation of the assembly connected to rotary encoder 200 when malfunction of the bearing configuration 220 has been detected.

The detection device 205 may be arranged to generate and transmit a signal for automatically disconnecting an emergency stop circuit when the operational operation is not occurring (e.g., malfunctioning of at least one of the bearing units 220a, 220b has been detected). Thus, operation of the assembly may be automatically shut down when a malfunction of at least one of the bearing units 220a, 220b is occurring.

FIG. 1b is a perspective view of the rotary encoder 200 illustrated in FIG. 1a.

FIG. 2a is a cross-sectional view of the rotary encoder 200, in which the rotary encoder is operating in a normal, functioning, state. This state is referred to as a first operational state. Fr example, the bearing configuration 220, including the first bearing unit 220a and the second bearing unit 220b, is operating without any malfunctioning. In the first operational state, the connection device 245 is operably connected between a fixed portion of the rotary encoder 200 and the bearing bushing 230. During operation of the rotary encoder 200 in the first operational state, it is determined that there is an operational connection provided and thus that no rotation of the bearing bushing 230 is occurring, because the rotational force between the bearing bushing 230 and the housing 280 is below the predetermined threshold. In the first operational state, there is no detected malfunction of the bearing configuration 220.

FIG. 2b is a cross-sectional view of the rotary encoder 200, in which the rotary encoder is operating in a non-normal, malfunctioning, state. This state is referred to as a second operational state. For example, the bearing configuration 220, including the first bearing unit 220a and the second bearing unit 220b, is not operating correctly. In the second state, the connection device 245 is not operably connected between a fixed portion of the rotary encoder 200 and the bearing bushing 230. It is noted that the bearing bushing 230 has been rotated clockwise to a certain extent, because the rotational force between the bearing bushing 230 and the housing 280 has exceeded the predetermined threshold and that operational connection has been lost. During operation of the rotary encoder 200 in the second operational state, it is determined that there is not an operational connection provided and thus that at least some rotation of the bearing bushing 230 has occurred. In the second operational state, it is detected that malfunction of the bearing configuration 220 is occurring.

FIGS. 3a and 3b are exploded views of the rotary encoder.

Figure 4:
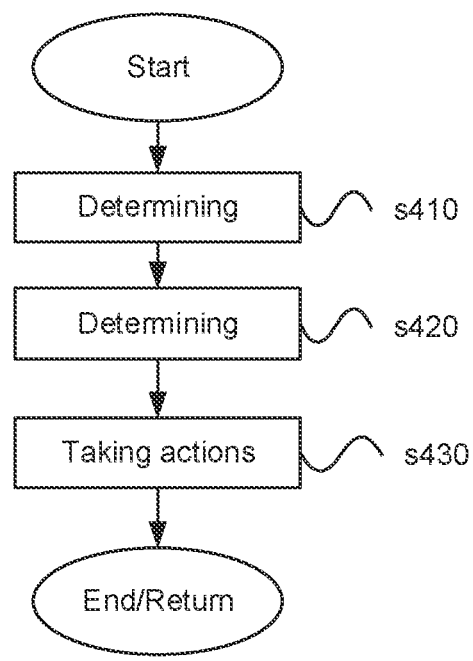
FIG. 4 is a flowchart illustrating a method according to an example embodiment of the present invention.

FIG. 4 is a flowchart illustrating a method according to an example embodiment of the present invention for determining a malfunction of a bearing configuration 220 of a rotary encoder 200. The rotary encoder 200 includes a shaft 210 having the bearing configuration 220. The bearing configuration 220 is internally connected to an axial bearing bushing 230 arranged in a housing 280. The bearing configuration 220 provides for rotation of the shaft 210 relative to the housing 280. The rotary encoder 200 further includes a rotor 250 being attached to the shaft 210. The rotary encoder 200 also includes a stator 260 and a detection device 205 configured to determine whether a connection device 245, 247 is operably connected between a fixed portion of the rotary encoder 200 and the bearing bushing 230 and to output the status of the connection to a control device 201. The method includes determining, in s410, whether there is a prevailing operable connection between the fixed portion of the rotary encoder 200 and the bearing bushing 220, and, if there is no connection, determining, in s420, that there is a rotation of the bushing associated with malfunction of the bearing configuration 220.

The connection device 245, 247 may include an electrical circuit to which an electrical signal is provided. The fixed portion includes the stator 260, and the electrical circuit is connected between the stator 260 and the bearing bushing 230. The determination, in s410, as to whether there is a prevailing operable connection includes determining whether there is an electrical signal. Thus, it is determined that there is a rotation of the bushing 230 associated with a malfunction of the bearing configuration 220 if there is no electrical signal.

After determining, in s410, and the determining, in s420, are performed, taking action(s), in s430, may be performed. For example, taking action(s) includes generating an alarm signal when a rotation of the bushing associated with a malfunction of the bearing configuration 220 has been determined. Thus, an operator at an early stage may be informed about that the bearing configuration 220 is malfunctioning. The operator may manually interrupt operation of the encoder 200 and/or operation of an assembly connected to the shaft 210.

For example, taking action(s) includes automatically interrupting operation of the assembly connected to the rotary encoder 200 when a rotation of the bearing bushing 230 associated with a malfunction of the bearing configuration 220 has been determined.

For example, taking action(s) includes automatically interrupting operation of the assembly connected to the rotary encoder 200. This may be performed by the control device 201 or the detection device 205. Interrupting operation of the assembly connected to the rotary encoder 200 may be performed by switching the power off, thus shutting down the assembly at least partly. This may be performed by the control device 201 or the detection device 205.

After taking action(s), in s430, the method ends.

Figure 5:
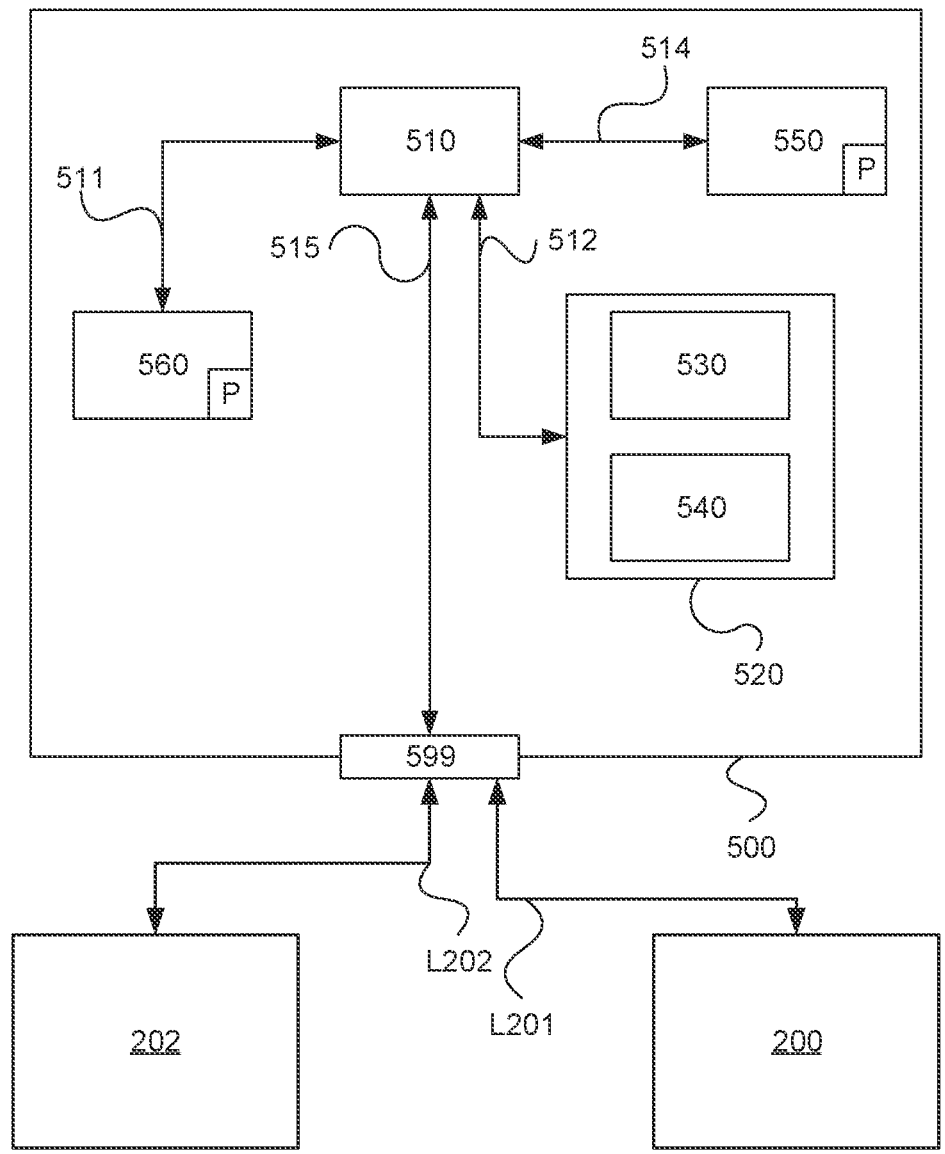
FIG. 5 illustrates a computer adapted to perform the method described herein.

FIG. 5 illustrates a computer 500. The control device 201 described with reference to, for example, FIG. 1a, may include the computer 500. The detection device 205 may include the computer 500. The computer 500 includes a non-volatile memory 520, a data processing unit, e.g., a processor, 510, and a read/write memory 550. The non-volatile memory 520 has a first memory element 530 in which a computer program, e.g., an operating system, is stored for controlling the operation of the computer 500. The computer 500 further includes a bus controller, a serial communication port, I/O device(s), an A/D converter, a time and date input and transfer unit, an event counter, and an interruption controller. The non-volatile memory 520 has also a second memory element 540. Additionally, there is a computer program P, e.g., a set of instructions, that, when executed by the processor 510, cause the processor 510 to perform a method as described herein.

The computer program P may include routines for generating an alarm signal when the status of the bearing configuration 220 received from the detection device 205 indicates a malfunctioning bearing configuration 220.

The computer program P may include routines for automatically interrupting operation of the assembly 600 when the status of the bearing configuration 220 received from the detection device 205 indicates a malfunctioning bearing configuration 220.

The computer program P may include routines for performing the method described herein.

The program P may be stored in an executable form or in compressed form in a memory 560 and/or in a read/write memory 550.

Where it is stated that the data processing unit 510 performs a certain operation or function, it means that it conducts a certain part of the program which is stored in the memory 560 or a certain part of the program which is stored in the read/write memory 550.

The data processing device 510 can communicate with a data port 599 via a data bus 515 and can control operations of the assembly 600 with a control port 588 via a control bus 525. For example, via the control bus 525 and the control port 588, the processing device 510 can interrupt the operation of the assembly 600 when a malfunction of the bearing configuration 220 has been determined. The non-volatile memory 520 is configured to communicate with the data processing unit 510 via a data bus 512. The separate memory 560 is configured to communicate with the data processing unit via a data bus 511. The read/write memory 550 is configured to communicate with the data processing unit 510 via a data bus 514. The links L201 and L202, for example, may be connected to the data port 599 (see, e.g., FIGS. 1a and 5) and a link L601 may connect the control port 588 to the assembly 600.

When data are received on the data port 599, they are stored in the second memory element 540. When received input data have been stored, the data processing unit 510 performs code execution as described above.

Parts of the methods herein described may be performed by the computer 500 by the data processing unit 510, which executes the computer program P stored in the memory 560 or the read/write memory 550. When the computer 500 executes the computer program P, the method is executed.

The method may be performed by the computer 500, for example. Any suitable processing circuitry may be used for performing the method. The processing circuitry may be arranged in the rotary encoder 200 or externally of the rotary encoder 200, such as at the assembly 600.

The computer program product includes a non-volatile, computer readable medium such as, for example, a universal serial bus (USB) memory, a plug-in card, an embedded drive, a read only memory (ROM), etc. The computer readable medium has stored thereon a set of program instructions. The computer program is loadable into the processing circuitry including in the control arrangement 201 or the rotation measurement circuitry of the stator 260. When loaded into the processing circuitry, the computer program may be stored in a memory associated with or included in the processing circuitry and executed by a processor. For example, the computer program may, when loaded into and executed by the processing circuitry, cause execution of method illustrated in FIG. 4 or otherwise described herein. For example, the malfunction determination device and/or the detection device may be implemented as electronic circuitry.

What is claimed is:

1. A rotary encoder, comprising:
    a shaft including a bearing configuration internally connected to an axial bushing arranged in a housing, the shaft being rotatable relative to the housing via the bearing configuration;
    a rotor attached to the shaft;
    a stator; and
    malfunction determination device adapted to determine a malfunction of the bearing configuration, the malfunction determination device including a detection device and a connection device, the detection device adapted to determine whether the connection device is operably connected between a fixed portion of the rotary encoder and the bushing and to output a status of the connection between the fixed portion of the rotary encoder and the bushing to a control device via a communication link, the detection device being adapted to determine a rotation of the bushing associated with the malfunction of the bearing configuration in response to there being no connection between the fixed portion of the rotary encoder and the bushing.

2. The rotary encoder according to claim 1, wherein the connection device includes an electrical circuit adapted to be provided with an electrical signal, the fixed portion including the stator, the electrical circuit being connected between the stator and the bushing, the detection device being adapted to determine, in connection with determining whether there is a connection, whether the electrical signal is present, and to determine that the bearing configuration is malfunctioning in response to absence of the electrical signal.

3. The rotary encoder according to claim 2, wherein the electrical circuit includes at least one electrical conductor connected to the bushing via a contacting member.

4. The rotary encoder according to claim 1, wherein the connection device includes a flexible support member adapted to facilitate the connection between the fixed portion and the bushing.

5. The rotary encoder according to claim 1, wherein the connection device is adapted to provide a wireless connection between the fixed portion and the bushing.

6. The rotary encoder according to claim 5, wherein the wireless connection includes an optical connection, a magnetic connection, and/or an inductive connection.

7. The rotary encoder according to claim 1, wherein the malfunction determination device includes a plate arranged between the rotor and the bushing, the plate being attached to the housing and being adapted to provide fixation in an axial direction of the shaft toward the bushing.

8. The rotary encoder according to claim 7, wherein the malfunction determination device includes a shear pin fixedly arranged between the bushing and the plate, the shear pin adapted to break in response to rotation of the bushing.

9. The rotary encoder according to claim 8, wherein the shear pin is adapted to break in response to rotational torque exceeding a predetermined threshold.

10. The rotary encoder according to claim 8, wherein the shear pin is adapted to break in response to rotational force exceeding a predetermined threshold.

11. The rotary encoder according to claim 1, wherein the malfunction determination device is adapted to determine the malfunction of the bearing configuration in response to a rotation of the bushing relative to the housing exceeding a predetermined threshold.

12. The rotary encoder according to claim 1, wherein the bearing configuration includes at least one bearing, including an inner ring attached to the shaft, and outer ring attached to the bushing, and roller elements arranged between the inner ring and the outer ring.

13. The rotary encoder according to claim 1, wherein the operable connection between the fixed portion and the bushing includes an electrical connection.

14. The rotary encoder according to claim 1, wherein the malfunction determination device is adapted to take an action in response to the determination of the malfunction of the bearing configuration.

15. The rotary encoder according to claim 14, wherein the action includes shutting down an assembly that includes the rotary encoder.

16. The rotary encoder according to claim 14, wherein the action includes outputting an alarm.

17. The rotary encoder according to claim 16, wherein the alarm includes a visual, audible, and/or tactile alarm.

18. A method for determining a malfunction of a bearing configuration of a rotary encoder, the rotary encoder including a shaft having the bearing configuration, the bearing configuration being internally connected to an axial bushing arranged in a housing, the shaft being rotatable relative to the housing via the bearing configuration, a rotor being attached to the shaft, the rotary encoder including a stator, a detection device, and a connection device, the detection device adapted to determine whether the connection device is operably connected between a fixed portion of the rotary encoder and the bushing and to output a status of the connection to a control device via a communication link, comprising:
    determining whether there is an operable connection between the fixed portion of the rotary encoder and the bushing; and
    if there is no connection, determining that there is a rotation of the bushing associated with the malfunction of the bearing configuration.

19. The method according to claim 18, wherein the connection device includes an electrical circuit adapted to be provided with an electrical signal, the fixed portion including the stator, the electrical circuit being connected between the stator and the bushing, the determination of whether there is an operable connection includes determining presence of an electrical signal, and determining that there is a rotation of the bushing associated with the malfunction of the bearing configuration including in response to absence of the electrical signal.

20. A non-volatile, computer-readable storage medium having stored there instructions, which, when executed by a processor causes the processor to perform a method for determining a malfunction of a bearing configuration of a rotary encoder, the rotary encoder including a shaft having the bearing configuration, the bearing configuration being internally connected to an axial bushing arranged in a housing, the shaft being rotatable relative to the housing via the bearing configuration, a rotor being attached to the shaft, the rotary encoder including a stator, a detection device, and a connection device, the detection device adapted to determine whether the connection device is operably connected between a fixed portion of the rotary encoder and the bushing and to output a status of the connection to a control device via a communication link, the method including:
  determining whether there is an operable connection between the fixed portion of the rotary encoder and the bushing; and
  if there is no connection, determining that there is a rotation of the bushing associated with the malfunction of the bearing configuration.

* * * * *